United States Patent

Bjorkstrom

[11] 3,981,711
[45] Sept. 21, 1976

[54] LUBRICATING SWABBING MEANS FOR GLASS CONTAINER MACHINE

[75] Inventor: Gösta Björkström, Limmared, Sweden

[73] Assignee: Aktiebolaget Platmanufaktur, Malmo, Sweden

[22] Filed: Feb. 18, 1975

[21] Appl. No.: 550,294

Related U.S. Application Data

[63] Continuation-in-part of Ser. No. 487,315, July 10, 1974, abandoned, which is a continuation of Ser. No. 299,359, Oct. 20, 1972, abandoned.

[30] Foreign Application Priority Data

Feb. 8, 1972    Sweden.............................. 1504/72

[52] U.S. Cl....................................... 65/165; 65/24; 65/26; 65/170; 65/207; 65/333; 164/14; 164/72; 164/267; 425/90
[51] Int. Cl.²......................................... C03B 39/00
[58] Field of Search................. 65/24, 26, 170, 165, 65/207, 333; 164/72, 14, 267; 425/90

[56]         References Cited
           UNITED STATES PATENTS

| | | | |
|---|---|---|---|
| 2,267,236 | 12/1941 | Goodrich | 65/165 |
| 3,347,650 | 10/1967 | Barkhan | 65/26 |
| 3,523,016 | 8/1970 | Mattos | 65/26 X |
| 3,580,711 | 5/1971 | Hamilton | 65/26 X |
| 3,623,856 | 11/1971 | Keller | 65/26 X |
| 3,721,542 | 3/1973 | Keller | 65/26 X |
| 3,814,594 | 6/1974 | Mumford | 65/170 |

Primary Examiner—S. Leon Bashore
Assistant Examiner—Frank W. Miga
Attorney, Agent, or Firm—Hane, Baxley & Spiecens

[57]         ABSTRACT

In a glass container making machine using a split face mold, means are provided for controllably diverting the parisons from the mouth of the mold to a waste glass collector when the mold is closed so that at the same time swabbing means lubricate the inner faces of the mold cavity.

5 Claims, 3 Drawing Figures

LUBRICATING SWABBING MEANS FOR GLASS CONTAINER MACHINE

This is a continuation-in-part application of Ser. No. 487,315, filed July 10, 1974 now abandoned, which is a continuation of application Ser. No. 299,359, filed Oct. 20, 1972 now abandoned.

The present invention relates to a glass container or package making machine for manufacturing glass articles such as jars, bottles and the like. In such machines the process commences with a parison or glass drop being supplied to a first mold in which the parison is blown or pressed into the form of a jar or bottle. After this first forming, the formed parison can be conveyed on to one or several additional molds for further forming in steps. (The machine can also be made in such a way as to deliver more than one parison, the additional parison being then formed in molds parallel with the previously mentioned molds.) The molds are split faced in that each mold consists of two mold sections which open up after the forming step in order to make available the formed object. As a rule, special pick-up members are used to remove the formed object from the mold. In each mold the inserted parison is subjected to blowing, so that the forming takes place. In the first mold, i.e., the one into which a glass parison is fed, it is essential that the wall of the mold, i.e., the mold surfaces which will contact the molten glass be lubricated. Normally, lubrication takes place every ten minutes, and then during the time a mold is open while the machine is in operation. Because of the short time the mold is open, there is usually only time to lubricate one of the mold sections at a time. In fact, the lubricating time is limited to about 1.5 seconds. It is, of course, very difficult to achieve good lubrication during this short time interval while the mold is open. During such lubrication, whether manual or otherwise, it cannot be avoided that lubricant is swabbed on the flat contacting surfaces of the mold sections merely because the mold is open and such contacting surfaces are exposed. The lubricant on these surfaces then builds up deposits, which thus cause gaps to be formed at the top and bottom of the mold. The edges of the mold are then soon burned by the received parisons. This leads to heavy repair costs, and the frequent replacement of the mold sections.

When the glass is blown in such molds, the glass penetrates into said gaps, and so-called cold glass beads are formed on the articles. These cold glass beads can cause cracks and fracture indications to arise in the article. Since the time available for the lubrication is very short, there is usually not sufficient time for the lubricant to dry. Thus, a certain amount of gas will develop between the mold and the glass since there is no possibility for the gas to escape. Hence, the glass will have thin spots, and there will be an uneven distribution of the glass. In addition, the above-described lubrication method which requires manual swabbing also causes accidents to occur because of the short time available for carrying out the lubrication.

Machines for manufacturing glass containers have been in use for a very long time, and during this long time there have always been the above-mentioned problems involved in achieving good lubrication of the first mold stage by swabbing the mold surfaces of opened split face molds.

Accordingly, people have tried to solve the lubrication problem by utilizing spraying means.

Many glass works have tried this method in vain due to two factors. First, in order to spray a solution of graphite and paraffin oil or the like, a solution with low viscosity must be used. Such solutions develop gas on the glass molding surfaces with resulting unevenness. Furthermore, it is very difficult to maintain the graphite evenly suspended and mixed in the paraffin and also to maintain the nozzles in operative condition without clogging. Second, the strong gas development results in environmental problems requiring costly remedial measures.

The effect of these disadvantages has made most glass works revert to swabbing. The swab may be well saturated with graphite paste, lubricating large surfaces very quickly and evenly without the above-mentioned disadvantages. Furthermore, the paste contains grease with low smoke developing properties.

It is accordingly a general object of the present invention to achieve lubrication in a glass container making machine as described above, which does not have the above-mentioned drawbacks.

According to the invention, lubrication is accomplished by having a waste glass receptacle arranged adjacent a member which catches a glass parison and conveys it to a split-faced mold which can be opened and closed and which coacts with a bottom presser and possibly with a feeding guide. In addition, the mechanisms which control the catching member, molds, bottom presser and possibly a feeding guide, has such properties that when the catching member is out of its operating position, the parison will go into the waste glass receptacle, while the mold is kept closed and the feeding guide and bottom presser assume such positions that they are not coacting with the mold. Hence, the mold is thus closed and lubrication can take place as long as the glass parisons are conveyed to the waste glass receptacle.

It is thus possible to lubricate the mold properly internally. Further, no lubricant is placed on the flat contacting surfaces of the mold since the mold is closed. Any gas that develops will have time to escape from the mold before the next glass drop is fed. The mold is automatically lubricated with the aid of a mechanism which automatically inserts and extracts a swab or a similar member provided with lubricant for the mold.

Further characteristics of the present invention will be apparent from the appended claims.

The present invention will be described in more detail with reference to the accompanying drawing, in which.

Figure 1:
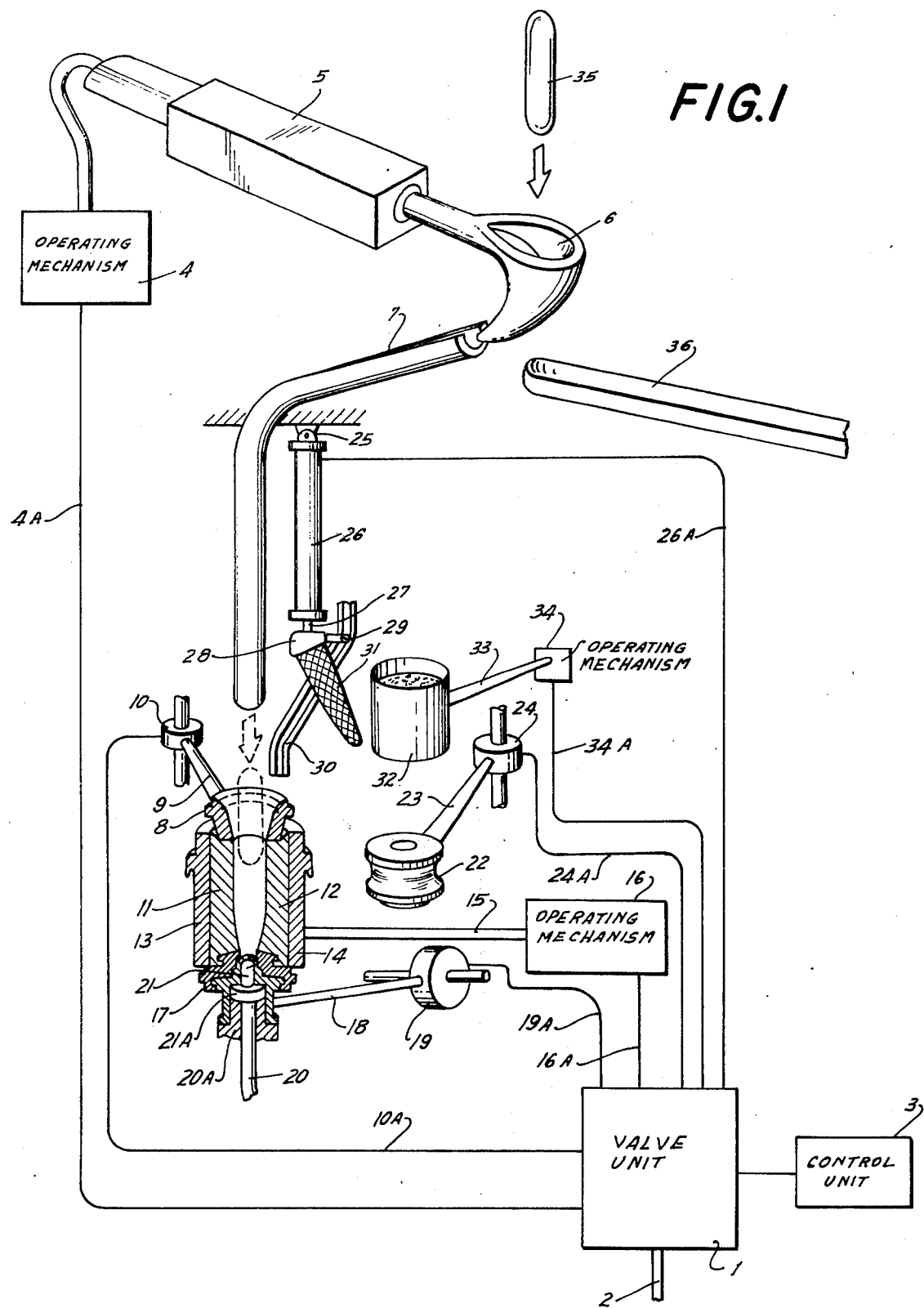
FIG. 1 shows the first forming stage of a glass container making machine in the operating situation in which it is about to form a glass parison.

The drawings show, very schematically, a glass package machine generally corresponding to the well-known IS machine made by Hartford-Empire Co. Such machines are usually controlled with a pneumatic medium which particularly consists of air. Thus, 1 is a valve unit which receives compressed air via a feed pipe 2 from a source not shown. The valves in the valve unit are controlled by a control unit or timer 3, so that the pnuematic medium is controllably fed to desired conduits in order to control various operating mechanisms.

In particular, the operating mechanism 4 is connected to the valve unit 1 via the conduit 4A. The operating mechanism 4 which is double acting, controls the movement of a catching device 5, which is provided with a catcher 6. The catcher is intended for catching a parison 35. The catcher 6 is arranged in connection with conveying device 7 for guiding a glass parison to a feeding guide 8, which is connected with an arm 9 whose movement is controlled by an operating mechanism 10 which receives the pneumatic medium via the conduit 10A from the valve unit 1. The feeding guide 8 is positioned on the upper end or mouth of a two-section mold having the mold sections 11 and 12. The mold sections, in turn, are arranged in two mold holders 13 and 14. The two mold holders are connected to an arm system 15 whose movement is controlled by an operating mechanism 16 which receives the pneumatic medium from the valve unit 1 via the conduit 16A. The arm system 15 has such properties that the mold sections can be set in one position in which the mold is closed, and in another position in which the mold is open, so that a formed article can be removed. Under the two mold sections 11 and 12, there is arranged a neck mold 17 which is connected to an arm system 18 controlled by an operating mechanism 19, to which pneumatic medium is conveyed from the valve unit 1 via the conduit 19A. Under the mold sections 11 and 12 there is an air supply conduit 20 connected to a nozzle 21 on mounting plate 21A which is supported by base member 20A, for forming of the received parison. A bottom presser 22 can be positioned in the place for the feeding guide 8. The bottom presser is connected to an arm 23 which is controlled by an operating mechanism 24. The operating mechanism is fed with the pneumatic medium for the valve unit 1 via the conduit 24A. Above the two mold sections 11 and 12 a suspension device 25 is arranged, on which one end of a cylinder 26 is suspended. The cylinder contains an axially movable plunger or piston 27. The cylinder receives the pneumatic medium via the conduit 26A from the valve unit 1. Ahead of the plunger a fastening device 28 is arranged. The fastening device has a guide pin 29, which runs in a guiding track 30. A swab 31 is arranged in the fastening device 28. The guiding track 30 has such properties that the swab 31 can be inserted in and extracted from the mold which is formed by the mold sections 11 and 12 in such a way that the inside walls of the mold are lubricated. The swab is appropriately supported so that satisfactory lubrication is obtained. Below the swab a vessel 32 is arranged. The vessel is connected to an arm system 33 controlled by an operating mechanism 34, which receives a pneumatic medium from the valve unit 1 via the conduit 34A. By means of the arm 33 and the operating mechanism 34, the vessel 32 can be moved up toward the swab 31, so that this will receive a sufficient quantity of lubricant. Note although FIG. 1 shows vessel 32 to the right of swab 31, the vessel normally is below the swab until raised by arm 33.

Figure 2:
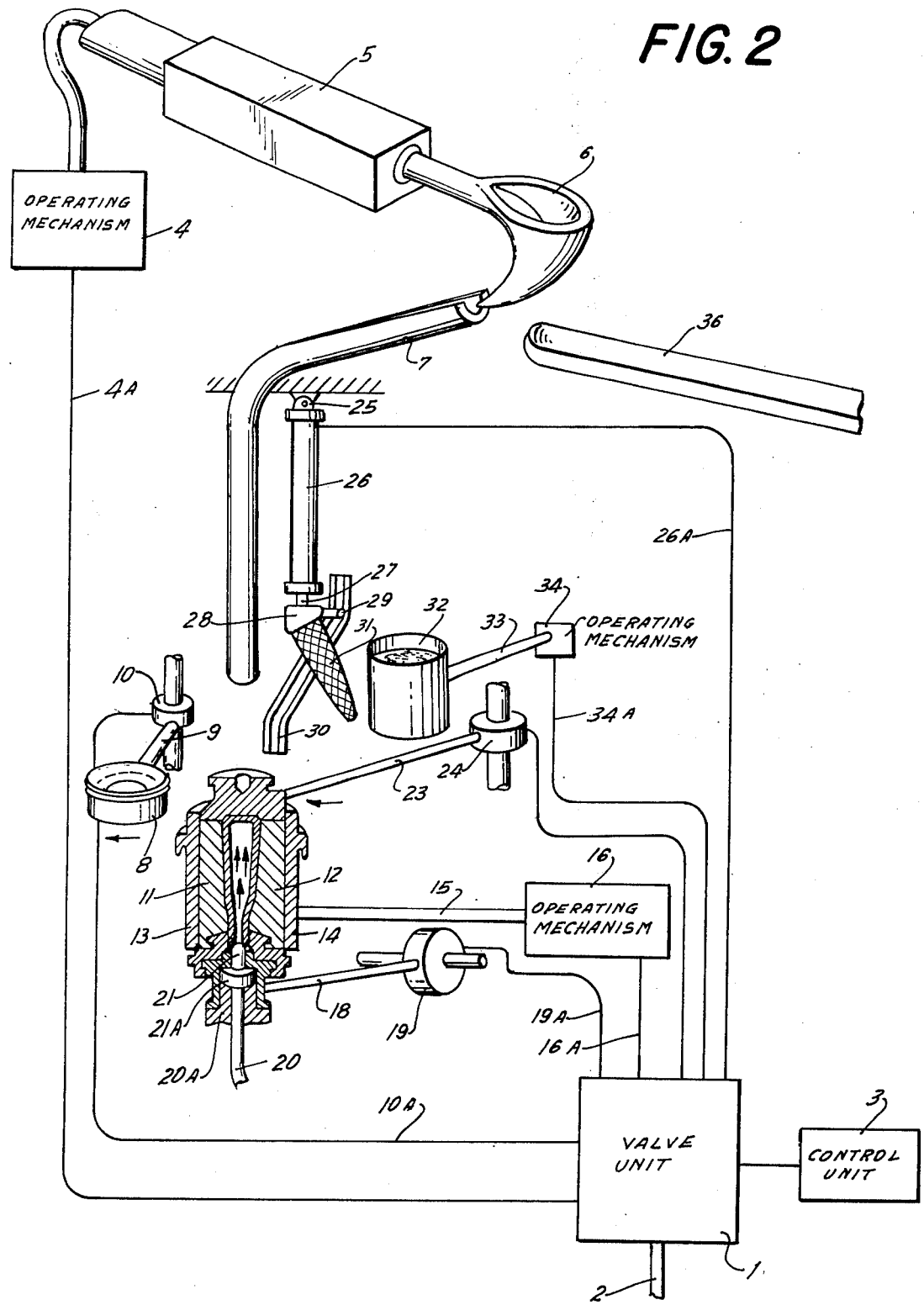
FIG. 2 shows the same arrangement as in FIG. 1, but with the difference that the parison is being formed.
Figure 3:
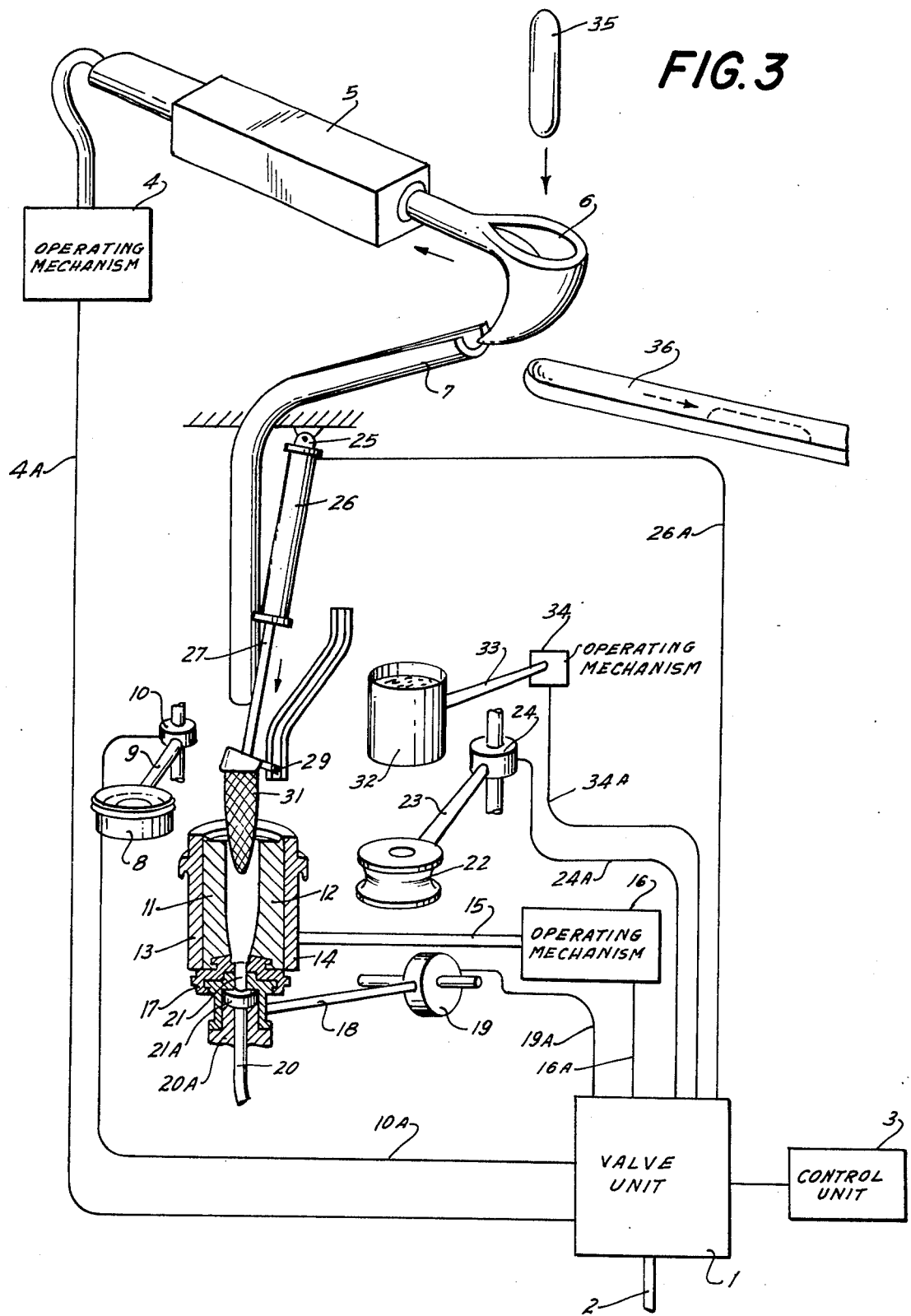
FIG. 3 shows the same machine as in FIGS. 1 and 2, in which the various parts have such positions that a glass parison is conveyed to a waste glass trough and the mold is in a closed position ready for lubrication.

In FIG. 2 all of the parts are in the same positions as in FIG. 1, with the exception of the feeding guide 8, the position of which has been taken over by the bottom presser 22. In FIG. 3 the catcher 6 is in its retracted position so as to be out of the path of movement of the parison. in this path a waste glass trough 36 is positioned, which catches the parison and leads it away. The operating mechanisms 10 and 24 assume such positions that both the feeding guide 8 and the bottom presser 22 assume removed positions. On the other hand, the mechanism 16 is set so that the mold sections 11 and 12 are in their closed positions.

The machine described above functions in the following way: After the glass parison is received through the feeding guide 8 the guide is moved away by elements 9 and 10 and replaced by the bottom presser 22. The parison is blown by compressed air through nozzle 21 and then the bottom presser 22 is removed. The base member 20A is lowered such that the nozzle 21 with its mounting plate 21A is brought out of cooperation with the neck mold 17. At the same time the mold sections 11 and 12 are opened and moved aside to allow the neck mold 17 with the parison to be lifted and brought bottom down to the not shown main mold by the arm 18, which is swung 180° by the operating mechanism 19.

In the lubricating phase, as shown in FIG. 3, the machine keeps on working but the control unit 1 retracts the diverting means 6, leaves the feeding guide 8 in its left position and the bottom presser 22 in its right position. Further, the control unit 1 stops the action of the neck mold 17 and the base member 20A and finally diverts the paste vessel 32 and orders the cylinder 26 to move the swab 31 into the closed mold.

It should be noted that the present invention is an improvement on the conventional IS machine by adding the catcher 6 and the parts associated therewith, the swab 31 and the parts associated therewith, the vessel 32 and the parts associated therewith, and the trough 36. In addition, additional valves are added to the valve unit 1 to energize the conventional mechanisms 4, 26 and 34. Finally, the control unit 3 is modified to perform the normal cycle of operations associated with the conventional IS machine and the cycle of operations in accordance with the invention. Accordingly, if the valves of unit 1 are solenoid operated, control unit 3 will sequentially energize the valves. This can be accomplished by a timer in the form of a cyclically driven rotary switch with two decks of contacts. A further switch can selectively apply current to the common contact of the first deck or the second deck. If the further switch is in one position the first deck is energized and the valves will be activated according to the conventional sequence. If the further switch is in another position the second deck is energized at the valves and will be actuated in the sequence according to the invention.

It should be obvious that the time set aside for the lubrication can be controlled in such a way that the machine is set for a certain number of drops to go to waste.

In addition, it should be noted that the air from nozzle 21 used for the forming when there is no glass drop in the mold, can be used for distribution of the lubricant and for blowing away superfluous lubricant.

What is claimed is:

1. In a glass container making machine having a source of glass parisons, a pair of mold sections which are controllably opened and closed to form a split faced mold, a feeding guide positioned above said split faced mold having a first end through which the glass parisons enter and a second end by which the glass parisons exit to descend upon the mouth of the split faced mold, means for moving said feeding guide between a first position above and laterally removed from said split faced mold with said second end spaced therefrom and a second position with said second end in close proximity to said mouth of said split faced mold, said first position defining the position of said feeding guide after the glass parisons have been fed to said mouth and said second position defining the position of said feeding guide when feeding the glass parison to said mouth, a conveying device fixedly mounted above said mouth of said split faced mold having a first end for receiving the glass parisons and a second end spaced downwardly from said first end and communicating with said first end of said feeding guide to direct the glass parisons thereto, catcher means mounted for reciprocable movement above said first end of said conveying device, said catching means having a first enlarged end for receiving therein the supply of glass parisons and a second end spaced below said first end for the exit of the glass parisons therefrom, means for reciprocating said catcher means between a first position with said second end of said catcher means directly above said first end of said conveying device and a second position with said second end spaced laterally from said first end of said conveying device so that the glass parisons being fed will be diverted from said conveying device, a neck mold mounted for reciprocating movement below said split faced mold, means for reciprocating said neck mold between a first position at the bottom of said split faced and a second position remote from said first position for subsequent treatment of the formed glass parisons, a nozzle for the spraying of compressed air, means for reciprocating said nozzle between a first position within said neck mold when said neck mold is in its first position and a second position removed from said neck mold to allow for the removal of the neck mold and the thus formed glass parisons, and a bottom presser for pressing the top of the glass parisons in the split faced mold when said neck mold and said nozzle are in their first positions, means for reciprocating said bottom presser between a first position in said mount of said split faced mold and a second position spaced from said first position, the improvement comprising a waste glass mounted below said second end of said catcher means for receiving the glass parisons when said catcher means is in its second position, a swabbing means for swabbing said split faced mold after the forming of an article, means for reciprocating said swabbing means between a first position above said mouth of said split faced mold and a second position within said mouth of said split faced mold, a vessel of lubricating material positioned above said mouth and movable between a first position directly beneath said swabbing means when said swabbing means is in its first position and in said vessel of lubricating material, and a second position spaced from said first position with said swabbing means spaced from said vessel of lubricating material, and means for reciprocating said vessel of lubricating material between said first position and said second position.

2. the glass container making machine according to claim 1, wherein said means for reciprocating said swabbing means comprises a track for guiding said swabbing means therealong, said track comprising a first end constituting said first position of said swabbing means and a second end spaced laterally from and below said first end constituting said second position of said swabbing means, and means for driving said swabbing means along said track between said first and second ends of said track.

3. The glass container making machine according to claim 2, wherein said track comprises a first straight vertical portion having said first end of said track therein, a second angled portion extending downwardly from said first straight vertical portion and extending at an angle to said vertical portion, and a third straight vertical portion extending downwardly from said second angled portion and having said second end of said track therein, said first straight vertical portion being spaced further in the lateral direction from said mouth than said third straight portion.

4. The glass container making machine according to claim 3, wherein said swabbing means comprises a swab guided in said track.

5. The glass container making machine according to claim 1, further comprising control means for controlling the operation and sequence of operation of said means for moving said feeding guide, said means for reciprocating said catcher means, said means for reciprocating said neck mold, said means for reciprocating said nozzle, said means for reciprocating said bottom presser, said means for reciprocating said swabbing means, and said means for reciprocating said vessel of lubricating material.

\* \* \* \* \*